US012600371B2

(12) United States Patent
Sakai et al.

(10) Patent No.: US 12,600,371 B2
(45) Date of Patent: *Apr. 14, 2026

(54) CONTROL DEVICE, CONTROL METHOD AND NON-TRANSITORY STORAGE MEDIUM

(71) Applicant: TOYOTA JIDOSHA KABUSHIKI KAISHA, Toyota (JP)

(72) Inventors: Akitsugu Sakai, Toyota (JP); Ryo Sumikura, Nisshin (JP); Taisuke Hayashi, Toyota (JP); Yuma Mori, Anjo (JP); Jun Aoki, Chuo-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,185

(22) Filed: Feb. 29, 2024

(65) Prior Publication Data

US 2024/0199043 A1     Jun. 20, 2024

Related U.S. Application Data

(63) Continuation of application No. 17/835,431, filed on Jun. 8, 2022, now Pat. No. 11,952,002, which is a (Continued)

(30) Foreign Application Priority Data

Dec. 9, 2019     (JP) ................................. 2019-222237

(51) Int. Cl.
B60W 50/08     (2020.01)
B60W 30/14     (2006.01)

(52) U.S. Cl.
CPC ........ B60W 50/085 (2013.01); B60W 30/143 (2013.01); B60W 50/087 (2013.01);
(Continued)

(58) Field of Classification Search
CPC .... B60W 50/06; B60W 50/08; B60W 50/082; B60W 50/085; B60W 50/087;
(Continued)

(56) References Cited

U.S. PATENT DOCUMENTS 4,716,788 A * 1/1988 Kita ...................... B60W 10/06
                                                          60/431
4,750,598 A * 6/1988 Danno .................... F16H 61/66
                                                          477/110

(Continued)

FOREIGN PATENT DOCUMENTS

JP         H04-321748 A  * 11/1992  ............. F02D 13/02
JP         2000-203303 A     7/2000
(Continued)

OTHER PUBLICATIONS

Berriri et al., Active damping of automotive powertrain oscillations by a partial torque compensator, Jul. 2008, Control Engineering Practice, vol. 16, Issue 7, pp. 874-883 (Year: 2008).*

(Continued)

*Primary Examiner* — Ramya P Burgess
*Assistant Examiner* — Sara J Lewandroski
(74) *Attorney, Agent, or Firm* — Oblon, McClelland, Maier & Neustadt, L.L.P.

(57)     ABSTRACT

A control device includes: an acquisition unit configured to acquire, from a driving assist system, a requested acceleration and ending information indicating an end of a deceleration control; and a control unit configured to control a powertrain and a brake based on the requested acceleration, and perform a prescribed process of stabilizing a driving force and a braking force that are generated in an ending process of the deceleration control based on the requested acceleration when the acquisition unit acquires the ending information.

10 Claims, 4 Drawing Sheets

Related U.S. Application Data continuation of application No. 16/948,546, filed on Sep. 23, 2020, now Pat. No. 11,383,729.

(52) U.S. Cl.
CPC ............... *B60W 2510/0657* (2013.01); *B60W 2520/105* (2013.01)

(58) Field of Classification Search
CPC .... B60W 50/10; B60W 50/12; B60W 30/143; B60W 30/146; B60W 30/02; B60W 30/06; B60W 30/045; B60W 2050/007; B60W 2050/0071; B60W 2050/0073; B60W 2050/009; B60W 2050/0091; B60W 2050/0093; B60W 2050/0094; B60W 2050/0095; B60W 2050/0096; B60T 8/1755; B60T 2270/303

See application file for complete search history.

(56) References Cited

U.S. PATENT DOCUMENTS

| | | | |
|---|---|---|---|
| 6,333,612 B1 | 12/2001 | Suzuki | |
| 2004/0034460 A1 | 2/2004 | Folkerts | |
| 2004/0040765 A1* | 3/2004 | Satou | B60K 31/04 180/170 |
| 2004/0211609 A1* | 10/2004 | Schmitt | B60K 28/16 180/197 |
| 2005/0071071 A1* | 3/2005 | Nagata | B60T 7/22 701/70 |
| 2007/0139255 A1* | 6/2007 | Kamping | B60W 30/16 342/72 |
| 2008/0140283 A1 | 6/2008 | Kuwahara et al. | |
| 2010/0179719 A1* | 7/2010 | Kimura | B60W 10/18 701/29.1 |
| 2010/0332093 A1* | 12/2010 | Ishikawa | B60W 10/06 701/62 |
| 2013/0311027 A1* | 11/2013 | Toyota | B60W 10/11 701/22 |

| | | | |
|---|---|---|---|
| 2014/0121928 A1 | 5/2014 | Kurumisawa | |
| 2014/0163832 A1* | 6/2014 | Beever | B60T 8/3205 701/70 |
| 2015/0134168 A1 | 5/2015 | Kawakami | |
| 2015/0175160 A1* | 6/2015 | Sudou | B60W 30/16 701/70 |
| 2015/0307098 A1 | 10/2015 | Maeda | |
| 2016/0090088 A1* | 3/2016 | Shah | B60W 30/14 701/93 |
| 2016/0221549 A1 | 8/2016 | Tanase | |
| 2016/0236675 A1 | 8/2016 | Baba | |
| 2016/0325745 A1 | 11/2016 | Kim | |
| 2017/0184042 A1 | 6/2017 | Konomi | |
| 2018/0134295 A1 | 5/2018 | Gaither | |
| 2018/0170344 A1 | 6/2018 | Laine | |
| 2019/0061744 A1 | 2/2019 | Ozawa et al. | |
| 2019/0250607 A1* | 8/2019 | Sadakiyo | B60W 30/18 |
| 2020/0101961 A1* | 4/2020 | Lee | B62M 6/45 |
| 2020/0247395 A1* | 8/2020 | Strandberg | B60W 30/18136 |
| 2020/0293026 A1 | 9/2020 | Ishii | |
| 2021/0031764 A1 | 2/2021 | Roques | |
| 2021/0094529 A1* | 4/2021 | Mizoguchi | B60W 10/04 |
| 2021/0237719 A1* | 8/2021 | Chen | F02D 11/107 |

FOREIGN PATENT DOCUMENTS

| | | | |
|---|---|---|---|
| JP | 2005-104320 A | | 4/2005 |
| JP | 2007-120352 A | | 5/2007 |
| JP | 2009-173105 A | | 8/2009 |
| JP | 2012184683 A | * | 9/2012 |
| JP | 2017020481 A | * | 1/2017 |
| WO | WO 2019/102540 A1 | | 5/2019 |

OTHER PUBLICATIONS

Office Action dated Dec. 19, 2022, issued in corresponding U.S. Appl. No. 17/835,431.
Office Action dated Jun. 7, 2023, issued in corresponding U.S. Appl. No. 17/835,431.
Notice of Allowance dated Dec. 15, 2023, issued in corresponding U.S. Appl. No. 17/835,431.

* cited by examiner

RELATED ART

CONTROL DEVICE, CONTROL METHOD AND NON-TRANSITORY STORAGE MEDIUM

CROSS-REFERENCE TO RELATED APPLICATION

This application is a continuation of U.S. patent application Ser. No. 17/835,431 filed on Jun. 8, 2022, which is a continuation of U.S. patent application Ser. No. 16/948,546 filed on Sep. 23, 2020, that issued on Jul. 12, 2022, as U.S. Pat. No. 11,383,729, which claims the benefit of Japanese Priority Patent Application No. 2019-222237 filed on Dec. 9, 2019, the entire contents of which are incorporated herein by reference.

BACKGROUND

1. Technical Field

The present disclosure relates to a control device, a control method and a non-transitory storage medium.

2. Description of Related Art

In recent years, vehicles have been equipped with various driving assist systems. A control device that controls a powertrain and brakes by appropriately arbitrating a request from such a driving assist system and a request from a user has been proposed (Japanese Unexamined Patent Application Publication No. 2007-120352 (JP 2007-120352 A)).

SUMMARY

When ending a driving assist function during a deceleration control for operating the brakes of the vehicle, the driving assist system executes a degeneration control in which a braking force resulting from the deceleration control is gradually decreased as a process at the end of the driving assist system, in order to save a user from feeling uncomfortable due to a sudden stop in deceleration. The degeneration control is ended when the following state is realized: the braking force is not generated in the brakes; unnecessary output torque is not generated in the powertrain; and a lower limit torque, which is the lower limit within a range of a torque that can be output, is output.

An electronic control unit (ECU) in which the driving assist system is implemented acquires the lower limit value of the torque that can be output at the time from an ECU that controls the powertrain via the in-vehicle network and performs a feedback control based on the acquired value to perform the degeneration control described above. The lower limit value changes depending on the state of the powertrain. Thus, if the degeneration control is delayed due to a communication delay of the in-vehicle network, the change in the lower limit value cannot be followed and there is a possibility that the control of the driving force and the braking force becomes unstable.

The present disclosure provides a control device that enhances a control stability at an end of a deceleration control by a driving assist system.

A control device according to a first aspect of the disclosure includes an acquisition unit configured to acquire, from a driving assist system, a requested acceleration and ending information indicating an end of a deceleration control; and a control unit configured to control a powertrain and a brake based on the requested acceleration, and perform a prescribed process of stabilizing a driving force and a braking force that are generated in an ending process of the deceleration control based on the requested acceleration when the acquisition unit acquires the ending information.

A control method according to a second aspect of the disclosure is performed by one or more processors. The control method includes: acquiring a requested acceleration and ending information indicating an end of a deceleration control, from a driving assist system; controlling a powertrain and a brake based on the requested acceleration, and performing a prescribed process of stabilizing a driving force and a braking force that are generated in an ending process of the deceleration control based on the requested acceleration when the processor acquires the ending information.

A non-transitory storage medium stores instructions that are executable by one or more processors and that cause the one or more processors to perform functions includes: acquiring a requested acceleration and ending information indicating an end of a deceleration control, from a driving assist system; controlling a powertrain and a brake based on the requested acceleration, and performing a prescribed process of stabilizing a driving force and a braking force that are generated in an ending process of the deceleration control based on the requested acceleration when the processor acquires the ending information.

According to the present disclosure, since the control device acquires the information indicating the end of the deceleration control by the driving assist system and performs the prescribed process triggered by the acquisition of the information, the control stability can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, an embodiment of the present disclosure will be described with reference to the drawings. While a driving assist system is performing a degeneration control, which is an ending process of a deceleration control, a control device according to the present embodiment detects the degeneration control and suppresses an output torque that is larger than a lower limit torque from being generated in a powertrain, regardless of an acceleration requested from the driving assist system. In this way, the degeneration control can be ended early to enhance a control stability of a vehicle.

Configuration

Figure 1:
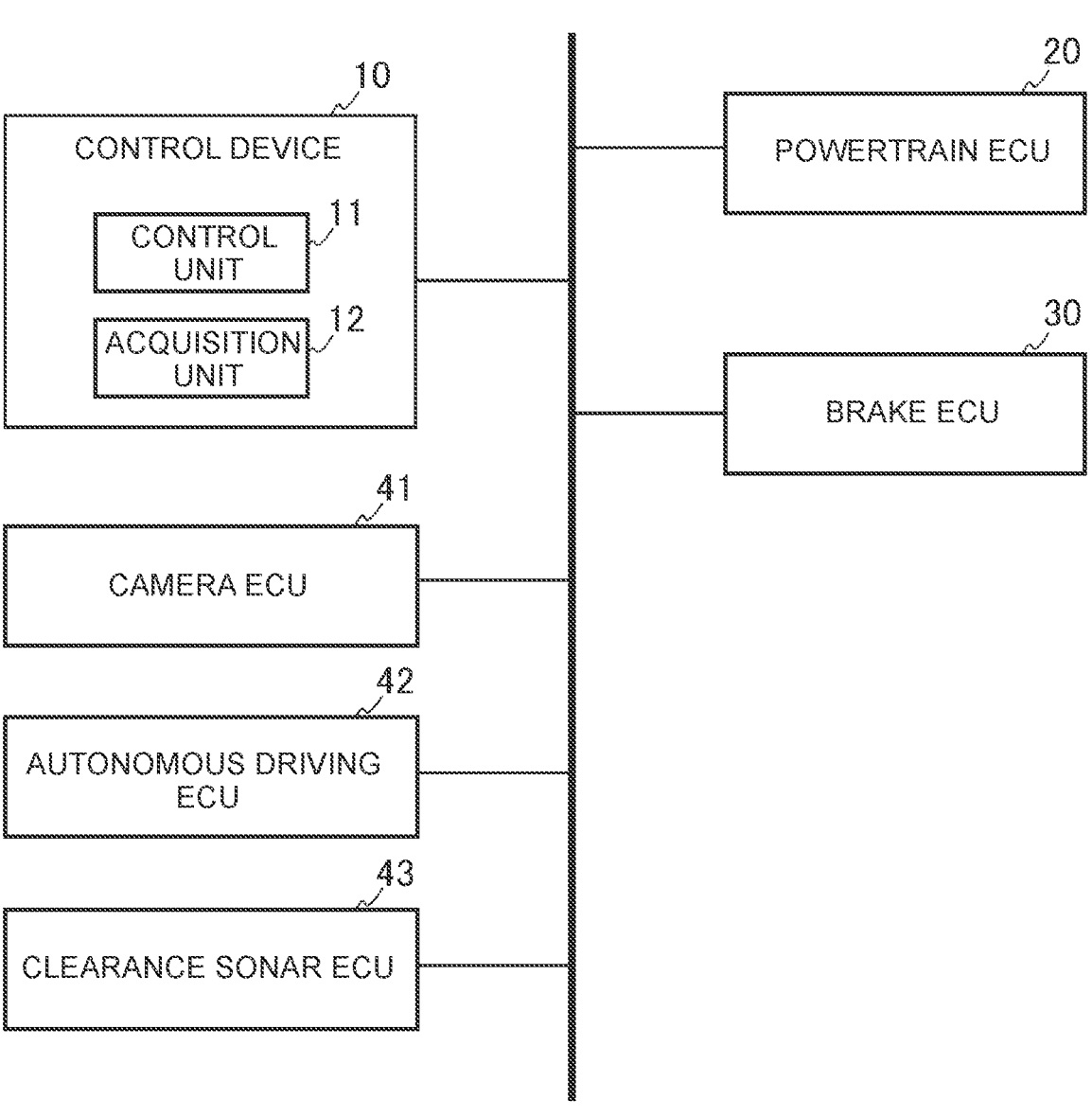
FIG. 1 is a configuration diagram of a control device and peripheral units thereof, according to an embodiment of the present disclosure.

FIG. 1 is a configuration diagram of a control device 10 and peripheral units thereof, according to the present embodiment.

In the present embodiment, a powertrain electronic control unit (ECU) 20 and a brake ECU 30 are connected to the control device 10 via a network. Various ECUs such as a camera ECU 41, an autonomous driving ECU 42, a clearance sonar ECU 43 are connected to the control device 10 via the network. The powertrain ECU 20 is an ECU that controls an engine and a transmission (or a motor) provided in the vehicle. The brake ECU 30 is an ECU that controls brakes provided in the vehicle. The control device 10 has an acquisition unit 12 that acquires information from these ECUs and a control unit 11 that controls the powertrain ECU 20 and the brake ECU 30 based on the acquired information and that can control a driving force and a braking force.

Hereinafter, when referring to the driving force and the braking force, both are expressed by their absolute values. When the driving force and the braking force are collectively referred to as a braking/driving force, the braking/driving force is expressed as a value with a reference sign in which the force is defined as positive when the force is applied in a traveling direction of the vehicle. When referring to an acceleration, the acceleration is expressed as a value with a reference sign in which the traveling direction of the vehicle is defined as a positive direction.

The control device 10 and the ECUs are each typically a computer provided with a control unit that is a processor, a memory, and the like. A function of the control device 10 may be implemented in a device such as an ECU that is provided independently. Otherwise, the function of the control device may be integrated in any of the powertrain ECU 20, the brake ECU 30, or the like, or be appropriately dispersed in each of the powertrain ECU 20, the brake ECU 30, or the like.

The camera ECU 41 is an ECU that has a function such as following a preceding vehicle and avoiding a collision. The autonomous driving ECU 42 is an ECU that implements an autonomous driving function that executes all driving tasks. The clearance sonar ECU 43 is an ECU that has a function such as avoiding a collision. In this way, the vehicle is provided with the driving assist system by the plurality of ECUs, for example. The control device 10 arbitrates a request from each driving assist system based on a prescribed rule, and controls the braking/driving force based on the arbitration result.

Process

Figure 2:
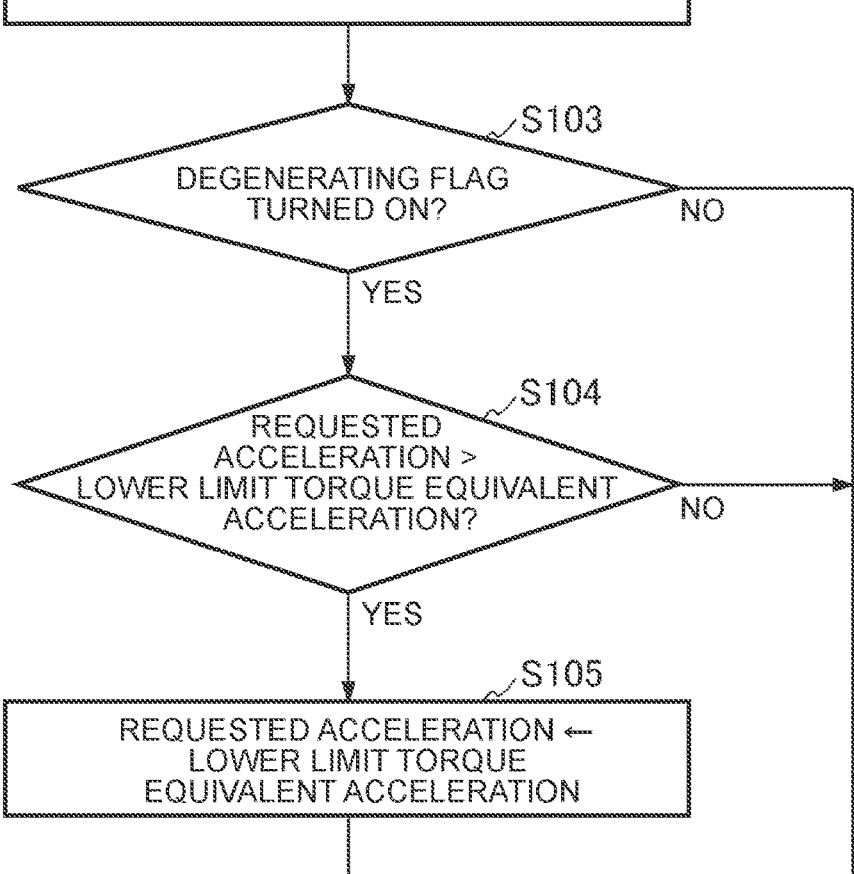
FIG. 2 is a flowchart of a process according to the embodiment of the present disclosure.

The degeneration response process performed by the control device 10 in response to the degeneration control of the driving assist system according to the present embodiment will be described below with reference to the flowchart in FIG. 2. In this process, one or more driving assist systems provided in the vehicle are operated, and the control device 10 controls the braking/driving force based on the request from the one driving assist system selected as the arbitration result. In addition, the process is executed repeatedly while the driving assist system is being operated.

Step S101

The acquisition unit 12 of the control device 10 acquires a requested acceleration and a degenerating flag that indicates whether the degeneration control for ending the deceleration control is being performed, from the selected driving assist system. The requested acceleration is the acceleration requested by the driving assist system to be generated by the vehicle. When the degenerating flag is turned on, this indicates that the driving assist system is performing a process of gradually reducing a degree of deceleration in order to end the deceleration control. That is, when the degenerating flag is turned on, this means that the driving assist system will end the deceleration control.

Step S102

The acquisition unit 12 acquires from the powertrain ECU 20, the lower limit torque that is the lower limit value of the torque that the powertrain can output at the time. The powertrain ECU 20 can calculate the lower limit torque based on an engine speed, a throttle opening degree, a gear ratio by a transmission or a torque converter at the time, etc., in the case of an engine vehicle, and based on a regenerative power generation rate at the time in the case of an electric vehicle.

Step S103

The control unit 11 of the control device 10 determines whether the degenerating flag is turned on. When the degenerating flag is turned on, the process proceeds to step S104, and when the degenerating flag is off, the process proceeds to step S106.

Step S104

The control unit 11 compares the requested acceleration with a lower limit torque equivalent acceleration. The lower limit torque equivalent acceleration is an acceleration generated in the vehicle by the lower limit torque. The control unit 11 can calculate the lower limit torque equivalent acceleration based on the lower limit torque and the weight of the vehicle, etc. In step S103, the acquisition unit 12 may acquire the lower limit torque equivalent acceleration, instead of the lower limit torque, from the powertrain ECU 20. When the requested acceleration is larger than the lower limit torque equivalent acceleration, the process proceeds to step S105, and when the requested acceleration is equal to or less than the lower limit torque equivalent acceleration, the process proceeds to step S106.

Step S105

The control unit 11 sets as the requested acceleration used for control in the next step S106, a value in which the requested acceleration acquired from the driving assist system is replaced by the lower limit torque equivalent acceleration. That is, the upper limit is guarded so that the requested acceleration used for control does not exceed the lower limit torque equivalent acceleration.

Step S106

The control unit 11 controls the powertrain ECU 20 and the brake ECU 30 based on the requested acceleration. If the requested acceleration is larger than the lower limit torque equivalent acceleration, the powertrain ECU 20 is controlled so as to generate an output torque larger than the lower limit torque in the powertrain and the brake ECU 30 is controlled so that the braking force is not generated in the brake, so that the requested acceleration is generated in the vehicle. If the requested acceleration is equal to or less than the lower limit torque equivalent acceleration, the powertrain ECU 20 is controlled so as to generate the lower limit torque in the powertrain and the brake ECU 30 is controlled so that the braking force is generated in the brakes, so that the requested acceleration is generated in the vehicle.

While the control is being performed by the driving assist system, the above steps S101 to S106 are executed repeatedly. When the requested acceleration is newly acquired from another driving assist system, the control device 10 can switch the process to a control based on a request of the other driving assist system in accordance with the arbitration result based on the prescribed rule.

Figure 3:
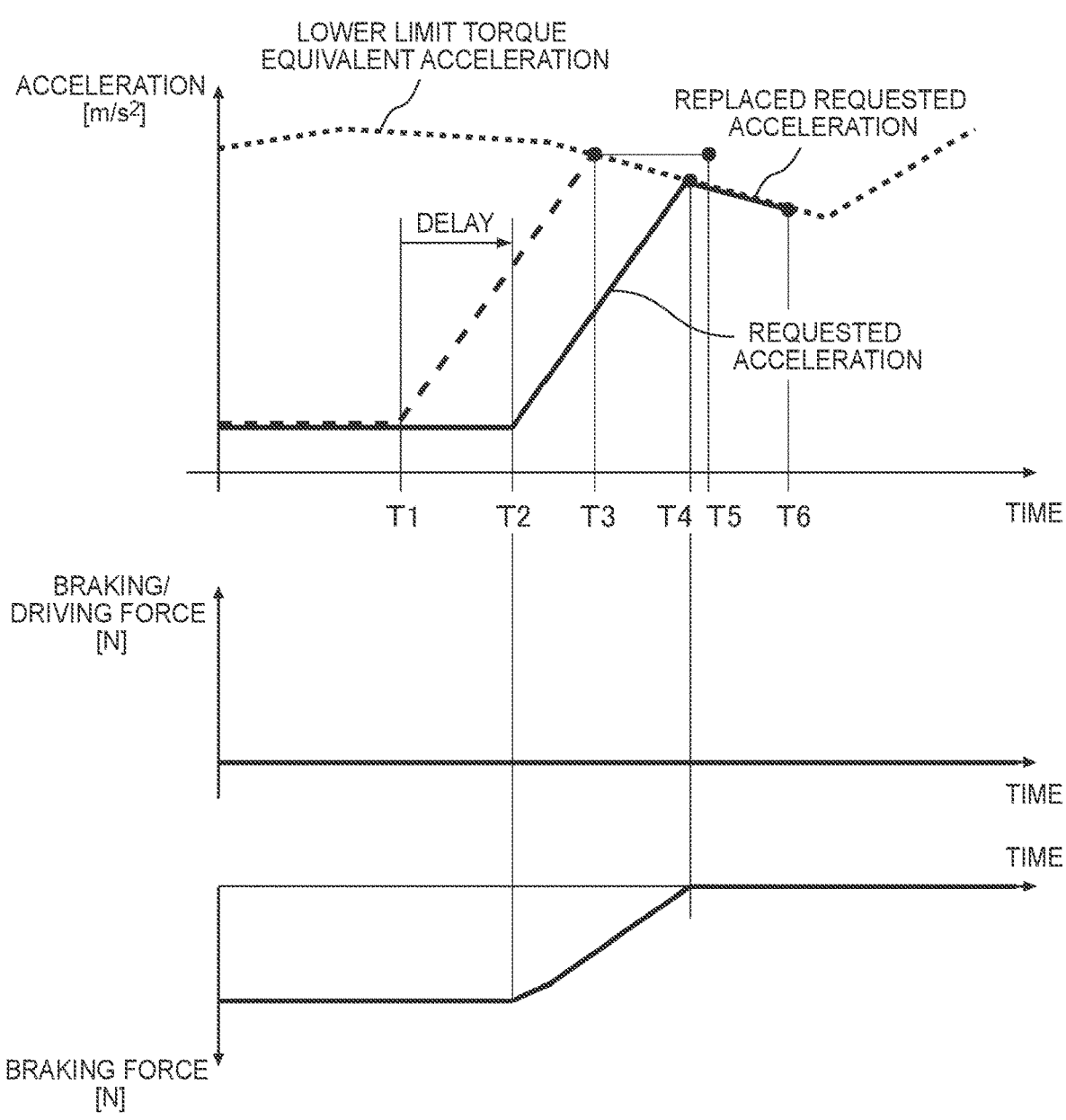
FIG. 3 is a graph of an example of a process according to the embodiment of the present disclosure.

An example of the control by the above process will be described. FIG. 3 schematically shows an example of the control. FIG. 3 is a graph in which the time is plotted on the horizontal axis and the acceleration, the braking/driving force, and the braking force are plotted on the vertical axis. The requested acceleration that the control device 10 uses for the process in step S106 described above, the braking/driving force generated in the powertrain (an offset from the lower limit torque at each time), and the braking force generated in the brakes are each indicated by a solid line. A part of the requested acceleration that is output to the control device 10 by the driving assist system is shown by a dotted line. The control device 10 acquires the requested acceleration after a fixed communication delay time has passed. The requested acceleration is actually a discrete value that is calculated by the driving assist system at regular intervals and that is acquired by the control device 10. However, the requested acceleration is indicated as being continuous in FIG. 3.

The driving assist system performs the deceleration control up to time T1 and determines to end the deceleration control at time T1 based on an instruction from the user, for example.

After time T1, the driving assist system turns on the degenerating flag, acquires the lower limit torque or the lower limit torque equivalent acceleration from the powertrain ECU 20, and gradually increases the requested acceleration while suppressing a steep change by setting an upper limit to an absolute value of a jerk for example, to perform the degeneration control with the objective of matching the requested acceleration to the lower limit torque equivalent acceleration. The control can be performed by a feedback control that compares the requested acceleration with the actual acceleration of the vehicle, for example. If there is no communication delay, the degeneration control ends at time T3 or in a relatively short time thereafter. In FIG. 3, the requested acceleration is indicated by a dotted line up to time T3.

The control device 10 acquires the requested acceleration with a delay and performs the process based on the requested acceleration. After time T2, the control device 10 performs the degeneration response process described above since the degenerating flag is turned on. After time T2, the lower limit torque tends to decrease, and at time T4, the requested acceleration acquired by the control device 10 exceeds the lower limit torque equivalent acceleration. From time T4 onward and at least up to time T5 is a period in which the requested acceleration is larger than the lower limit torque equivalent acceleration. Thus, during this period, the control device 10 replaces the requested acceleration with the lower limit torque equivalent acceleration, as the degeneration response process.

With the above process, the lower limit torque of the braking/driving force generated in the powertrain is maintained, no unnecessary output torque is generated, and the state of the powertrain is stable. Thus, even if there is a delay, the degeneration control is easily converged and the degeneration control can be ended at time T6, for example.

Since there is a delay in the acquisition of the lower limit torque acquired by the control device 10 in step S103 described above due to the communication delay, there is a case in which the acquired lower limit torque is different from the lower limit torque at the time of the acquisition. Even in such a case, the lower limit torque acquired in step S103 is more recent than the lower limit torque acquired by the driving assist system at the time of calculating the requested acceleration acquired in step S101. Thus, it is possible to perform the degeneration response process that reflects the new lower limit torque, and therefore it is possible to speed up the convergence of the degeneration control.

The degeneration response process may be modified as appropriate as long as the process can stabilize the degeneration control. For example, in step S105, instead of replacing the requested acceleration with the lower limit torque equivalent acceleration, the powertrain ECU 20 may be instructed to prohibit the generation of a driving force that is larger than the lower limit torque at the time, regardless of the instruction in the next step S106.

Figure 4:
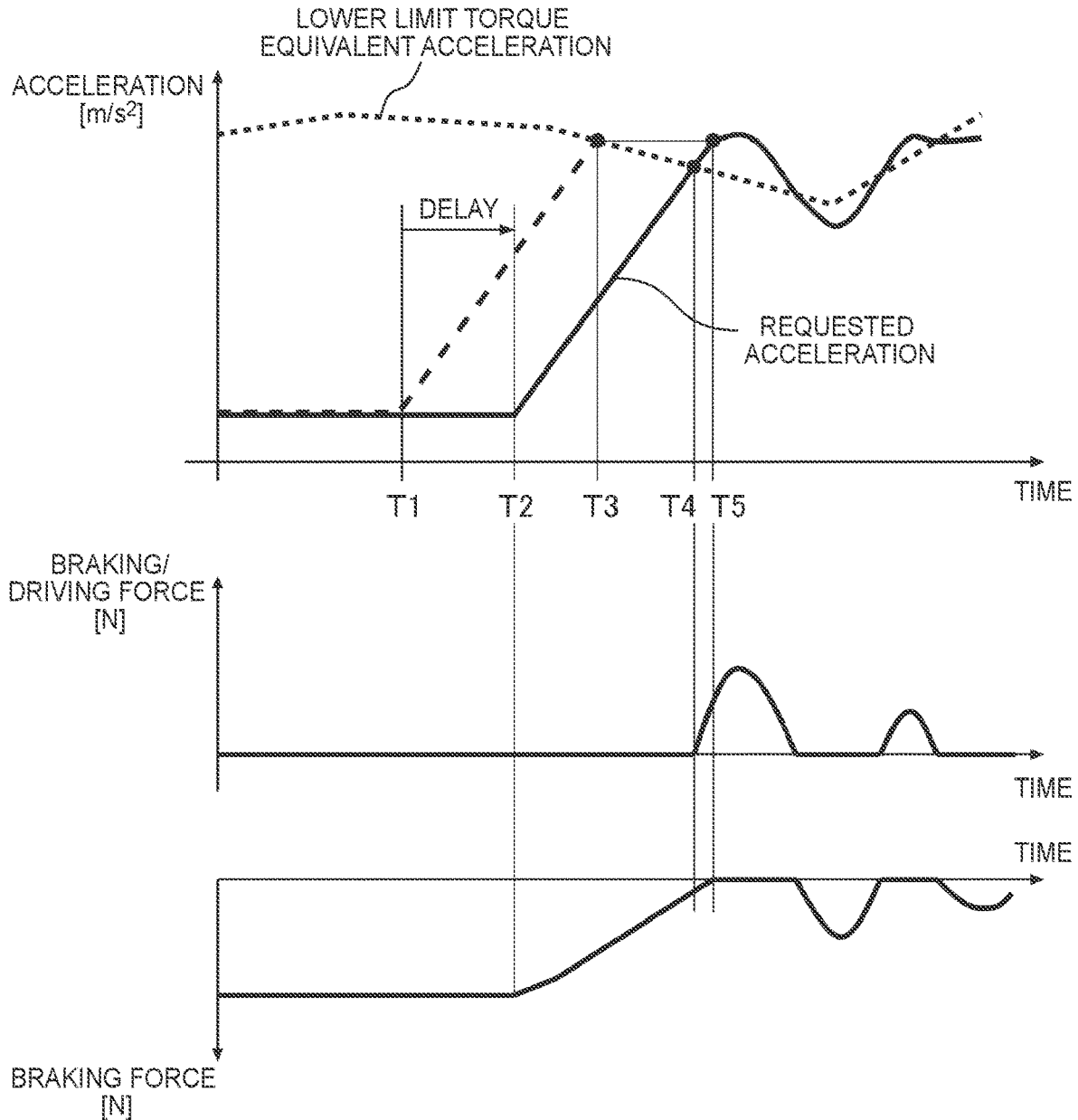
FIG. 4 is a graph of an example of a process according to a comparative example.

As a comparative example, an example of a control when the control device 10 does not perform the degeneration response process described above will be indicated below. Similar to FIG. 3, FIG. 4 schematically shows the example of the control.

The driving assist system performs the deceleration control up to time T1, and determines to end the deceleration control at time T1 based on an instruction from the user, for example.

After time T1, the driving assist system acquires the lower limit torque or the lower limit torque equivalent acceleration from the powertrain ECU 20, and gradually increases the requested acceleration while setting the upper limit to the absolute value of the jerk, to perform degeneration control with the objective of matching the requested acceleration with the lower limit equivalent acceleration. The control can be performed by the feedback control that compares the requested acceleration with the actual acceleration of the vehicle, for example. If there is no communication delay, the degeneration control ends at time T3.

The control device 10 acquires the requested acceleration with a delay and performs the process based on the requested acceleration. Since the lower limit torque tends to decrease, at time T4, the requested acceleration acquired by the control device 10 exceeds the lower limit torque equivalent acceleration. Since the control device 10 does not perform the degeneration response process described above after time T4, a driving force larger than the lower limit torque is generated in the powertrain.

The lower limit torque is not maintained for the braking/driving force that is generated in the powertrain and the powertrain is unnecessarily operated to the driving side. Thus, the degeneration control by the driving assist system becomes difficult to converge, control hunting occurs in which the driving force generated by the powertrain and the braking force generated by the brake oscillate, and there is a possibility that the completion of the degeneration control is delayed or that the degeneration control cannot be ended.

Effects

In the control device 10 according to the present embodiment, while the degeneration control is being performed by the driving assist system at the end of the deceleration control, the control device 10 detects the degeneration control and the powertrain is suppressed from generating a braking/driving force that is larger than the lower limit torque regardless of the requested acceleration from the driving assist system. In this way, the degeneration control can be ended early to enhance the control stability of the vehicle.

The control device 10 can detect that the degeneration control is being performed, with a simple method of acquiring the degenerating flag. Further, each driving assist system imposes a minimum limit called the upper limit guard on the requested acceleration calculated by a unique method while the degeneration control is being performed. However, since there are no other restrictions, each driving assist system can utilize the degeneration control method, which is adopted by the corresponding driving assist system based on the characteristics, to the maximum.

In order to make the driving assist system compatible with the present embodiment, it is only necessary to additionally implement a function of turning on the degenerating flag while the degeneration control is being performed to notify the control device 10. Thus, the amount of programs to be added is small, and a development amount and a memory amount can be economized. Further, a communication amount for notification of the degenerating flag is also small. In recent years, as a process during the degeneration control, a specification standard has been proposed in which the driving assist system generates various numerical parameters related to the degeneration control in addition to the requested acceleration and sends the numerical parameters to the in-vehicle network. Compared to when the standard is adopted, costs of the communication traffic, the process amount, the memory amount, and the development amount can be greatly suppressed according to the present disclosure.

The present disclosure is not limited to the control device of the vehicle, and can be construed as a driving assist system including a control device and other devices, a control method executed by a control device provided with a processor and a memory, a control program, a non-transitory storage medium storing a control program, and a vehicle provided with a control device, etc.

The present disclosure is useful as a control device mounted on a vehicle or the like.

What is claimed is:

1. A control device, comprising:
one or more processors configured to:
   acquire, from a driving assist system configured to execute a deceleration control, a requested acceleration and an ending time indicating an end of the deceleration control;
   when the ending time is acquired, control a powertrain to gradually reduce deceleration and to gradually accelerate based on the requested acceleration over a period of time; and
   during the period of time, replace the requested acceleration with a lower limit torque acceleration when the requested acceleration is greater than the lower limit torque acceleration, the lower limit torque acceleration varying based on a detected attribute of the powertrain.

2. The control device according to claim 1, wherein:
the one or more processors are configured to
   acquire a lower limit value of a torque that the powertrain is allowed to output;
   calculate the lower limit torque acceleration based on the lower limit value;

turn on a degenerating flag over the period of time beginning when the one or more processors acquires the ending time; and
   while the degenerating flag is turned on, compare the requested acceleration with the lower limit torque acceleration and prohibit the powertrain from generating a driving force that is larger than the lower limit value of the torque.

3. The control device according to claim 2, wherein:
the degenerating flag corresponds to the end of the deceleration control.

4. The control device according to claim 1, wherein the lower limit torque acceleration is based a regenerative power generation rate.

5. The control device according to claim 1, wherein the one or more processors are further configured to:
   set an upper limit to an absolute value of a jerk; and
   gradually increase the requested acceleration based on the upper limit.

6. The control device according to claim 1, wherein the one or more processors are configured to:
   acquire the requested acceleration from the driving assist system after a fixed communication delay time has passed; and
   control the powertrain by a feedback control that compares the requested acceleration with an actual acceleration.

7. The control device according to claim 1, wherein the lower limit torque acceleration is based an engine speed.

8. The control device according to claim 1, wherein the lower limit torque acceleration is based a throttle opening degree.

9. A control method performed by one or more processors comprising:
   acquiring, from a driving assist system configured to execute a deceleration control, a requested acceleration and an ending time indicating an end of the deceleration control;
   when the ending time is acquired, controlling a powertrain to gradually reduce deceleration and to gradually accelerate based on the requested acceleration over a period of time; and
   during the period of time, replace the requested acceleration with a lower limit torque acceleration when the requested acceleration is greater than the lower limit torque acceleration, the lower limit torque acceleration varying based on a detected attribute of the powertrain.

10. A non-transitory storage medium storing instructions that are executable by one or more processors and that cause one or more processors to perform functions comprising:
   acquiring, from a driving assist system configured to execute a deceleration control, a requested acceleration and an ending time indicating an end of the deceleration control;
   when the ending time is acquired, controlling a powertrain to gradually reduce deceleration and to gradually accelerate based on the requested acceleration over a period of time; and
   during the period of time, replace the requested acceleration with a lower limit torque acceleration when the requested acceleration is greater than the lower limit torque acceleration, the lower limit torque acceleration varying based on a detected attribute of the powertrain.

* * * * *